United States Patent
Becker et al.

(10) Patent No.: US 6,247,296 B1
(45) Date of Patent: Jun. 19, 2001

(54) DRIVE ARRANGEMENT FOR THE CROP CONVEYING AND/OR PROCESSING MECHANISM OF A HARVESTING MACHINE

(75) Inventors: Klaus Becker, East Moline, IL (US); Bernd Kempf, Althornbach; Jörg Weissig, Saarbrücken, both of (DE)

(73) Assignee: Deere & Comapny, Moline, IL (US)

( * ) Notice: Subject to any disclaimer, the term of this patent is extended or adjusted under 35 U.S.C. 154(b) by 0 days.

(21) Appl. No.: 09/480,954

(22) Filed: Jan. 11, 2000

(30) Foreign Application Priority Data

Apr. 23, 1999 (DE) ............................................... 199 18 550

(51) Int. Cl.⁷ .................................................. A01D 69/08
(52) U.S. Cl. ................................ 56/11.2; 460/20; 56/10.8
(58) Field of Search ..................................... 56/11.2, 11.7, 56/10.8, 10.7, 10.9; 460/20, 70

(56) References Cited

U.S. PATENT DOCUMENTS

| | | |
|---|---|---|
| 4,138,837 | 2/1979 | Love . |
| 4,218,864 * | 8/1980 | Allemeersch et al. ................ 56/11.2 |
| 4,430,847 | 2/1984 | Tourdot et al. . |
| 4,512,139 * | 4/1985 | Musser et al. ......................... 56/11.2 |
| 4,663,919 * | 5/1987 | Stroh et al. ............................ 56/11.2 |
| 5,462,486 * | 10/1995 | Norton .................................. 460/20 |
| 5,527,218 | 6/1996 | Van den Bossche et al. . |
| 5,778,644 | 7/1998 | Keller et al. . |
| 5,791,128 | 8/1998 | Rogalsky . |

FOREIGN PATENT DOCUMENTS

| | | |
|---|---|---|
| 70 39 302 | 7/1972 | (DE) . |
| 27 45 564 | 4/1978 | (DE) . |
| 28 19 200 | 11/1978 | (DE) . |
| 30 14 914 C2 | 3/1985 | (DE) . |
| 37 08 550 A1 | 9/1987 | (DE) . |
| 3708550 A1 | 9/1987 | (DE) . |
| 43 08 084 A1 | 9/1994 | (DE) . |
| 42 30 534 C2 | 11/1994 | (DE) . |
| 196 06 388A1 | 8/1997 | (DE) . |
| 0 680 687 A1 | 11/1995 | (EP) . |

* cited by examiner

Primary Examiner—Robert E. Pezzuto
Assistant Examiner—Arpad Fabian Kovacs

(57) ABSTRACT

The invention concerns a drive arrangement of a crop conveying and/or processing mechanism of a harvesting machine with an internal combustion engine (25) that is arranged to drive the crop conveying and/or processing mechanism through power transmission elements in a first operating mode in a first direction at a first speed, and a reversible motor (86) that is arranged to drive the crop conveying and/or processing mechanism in a second operating mode at a second speed in a second direction that differs from the first direction. The drive arrangement is also able to be driven in one or both of third and fourth operating modes. In the third operating mode the reversible motor (86) drives the crop conveying and/or processing mechanism in the first direction at a third speed, that is lower than the first speed and in the fourth operating mode the drive of the crop conveying and/or processing mechanism is separated from the internal combustion engine (25) and the reversible motor (86) operates as a brake for the crop conveying and/or processing mechanism.

17 Claims, 4 Drawing Sheets

DRIVE ARRANGEMENT FOR THE CROP CONVEYING AND/OR PROCESSING MECHANISM OF A HARVESTING MACHINE

BACKGROUND OF THE INVENTION

1. Field of the Invention

The invention concerns the drive arrangement of a crop conveying and/or processing mechanism of a harvesting machine with a main drive engine that is arranged to drive the crop conveying and/or processing mechanism through power transmission elements in a first operating mode in a first direction at a first speed, and a reversible motor that is arranged to drive the crop conveying and/or processing arrangement in a second operating mode at a second speed in a second direction that differs from the first direction.

2. Description of the Related Art

A drive arrangement of this type is described in DE 37 08 550 A. In a combine a reversible motor is driven mechanically in normal harvesting operation and it operates as a pump and hydraulically drives a motor that operates a reel. The feederhouse is also driven mechanically in normal harvesting operation. In reverse operation the reversible motor and the motor driving the reel are driven hydraulically, so that the intake devices driven by these motors are moved in the opposite direction in order to conduct crop that had been jammed out of the combine.

U.S. Pat. No. 5,527,218 discloses a forage harvester and a combine with a similar drive for the intake devices.

In the prior art, only a normal harvesting mode and a reverse mode are provided by the drive of the intake devices.

The problem underlying the invention is seen in the fact that the two known operating modes of the drive mechanism of the intake devices are not adequate in all cases.

SUMMARY OF THE INVENTION

This problem is solved according to the present invention by the provision of third and fourth operating modes for the drive arrangement in addition to the first operating mode (normal harvesting operation in which the crop conveying and/or processing mechanisms are driven by the main drive engine) and a second operating mode (reverse operation by means of the reversible motor) operated in another manner. In some embodiments of the invention, only one of the third and the fourth operating modes are made available in addition to the first and the second operating modes. It is the preferred embodiment to make both the third and the fourth operating modes available. It is obvious that the aforementioned operating modes can only be applied after each other, not simultaneously.

In the third operating mode, the crop conveying and/or processing mechanism is driven in the direction in which it is also driven in normal harvesting operation (that is, the first operating mode), however, with a reduced speed compared to the normal operating mode. This operating mode is particularly appropriate for the slow introduction of a larger amount of crop into a harvesting machine after a jamming of the machine. The fourth operating mode is an emergency stop, in which the drive of the internal combustion engine is uncoupled from the crop conveying and/or processing mechanism. It can be actuated by an emergency stop button. In order to dissipate the kinetic energy of the crop conveying and/or processing mechanism as rapidly as possible, the reversible motor is used as a brake. The fourth operating mode, therefore, makes possible a rapid stopping of the crop conveying and/or processing mechanism in an emergency. An additional brake is not necessary.

In this way additional, useful operating modes are made available for the drive arrangement of the crop conveying and/or processing mechanism.

It is an advantage that the drive of the reversible motor is connected to the crop conveying and/or processing mechanism not only in the second, third and/or fourth operating modes, but also in the first operating mode. The advantage lies in the fact that in the fourth operating mode no time consuming clutch engagement, or the like, of the reversible motor is needed any more. In the case of an emergency stop, the drive arrangement should be able to shift directly and rapidly from the first to the fourth operating mode. Furthermore, in this embodiment the reversible motor can be employed as a pump in the first operating mode, in case it is a hydraulic motor, and the oil pressure generated can be used to drive a second hydraulic motor. The speed of the second hydraulic motor is preferably variable. This can be controlled by an adjustable throttling valve arranged in parallel or in series with it. The adjustment can be performed mechanically, hydraulically or by means of an electric motor from the operator's cab. It is also conceivable to employ an electric motor as a reversible motor, and to convert the electromotive force [EMF] generated by it in the fourth operating mode into heat by resistance.

Most appropriately, the drive of the crop conveying and/or processing mechanism is separated from the internal combustion engine in the second and third operating modes. Hence, in these operating modes, the reversible motor alone drives the crop conveying and/or processing mechanism. The separation of the drives can be performed in known manner by an electric clutch that is arranged in a belt pulley or by a drive belt whose tension can be varied by a hydraulically adjustable tension pulley, as is described in U.S. Pat. No. 5,527,218, whose contents are incorporated herein by reference.

As already mentioned, in the fourth operating mode the reversible motor is used as brake for the crop conveying and/or processing mechanism. For this purpose the reversible motor that is used as a pump has its oil pressure dissipated and converted into heat. Therefore it is proposed that the oil pressure generated by the reversible motor in the fourth operating mode be dissipated through a valve, in particular a pressure relief valve. In addition, the oil pressure can also be dissipated through the second hydraulic motor that converts it into mechanical movement and friction energy.

Furthermore, it is recommended that the speed of the reversible motor be adjustable in the second and/or third operating modes. For this purpose an adjustable throttling valve may be employed that preferably can be controlled from the operator's cab (mechanically, hydraulically or by means of an electric motor). As an alternative, the reversible motor may be a hydraulic motor with adjustable speed, whose speed can be controlled by means of a swash plate.

The reversible motor and the second hydraulic motor may be operated in series in the second and/or the third operating modes. The oil originating at a source of oil pressure, with which the two aforementioned motors are driven, therefore flows initially through the reversible motor and then through the second hydraulic motor (or in the opposite order). The advantage lies in the saving of an additional hydraulic line, which would be necessary in a parallel circuit, and the fact that no valves are necessary for switching for the first and/or the fourth operating modes, in which the aforementioned motors are also routed in series, since the reversible motor also conveys the oil to the second hydraulic motor in these operating modes. As a result, the hydraulic circuit is simple and low cost.

The invention can be applied to every harvesting machine with a reversible conveyor and/or header. It can be used in particular on forage harvesters in which the crop conveying and/or processing mechanism is provided with a chopper drum and/or a kernel processor and/or a pair of supply rolls. The invention is also appropriate for combines in which the crop conveying and/or processing mechanism is provided with a feederhouse, preferably with a conveyor chain and/or a header (in particular a cutting plafform). In combines the second hydraulic motor may, in particular, drive a reel, that also can be reversed in the second operating mode.

DETAILED DESCRIPTION OF THE PREFERRED EMBODIMENT

Figure 1:
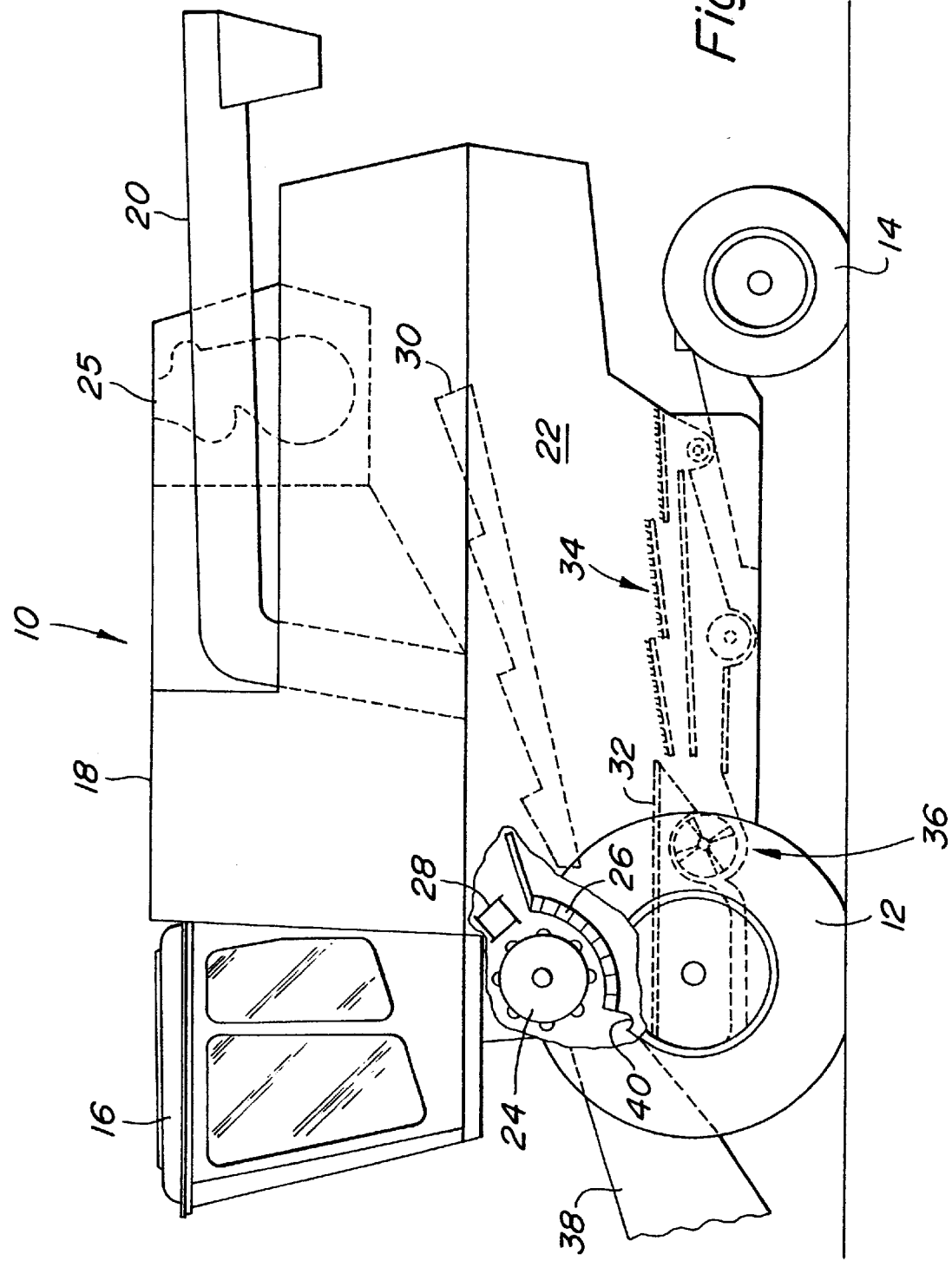
FIG. 1 is a side view of an agricultural combine.
Figure 2:
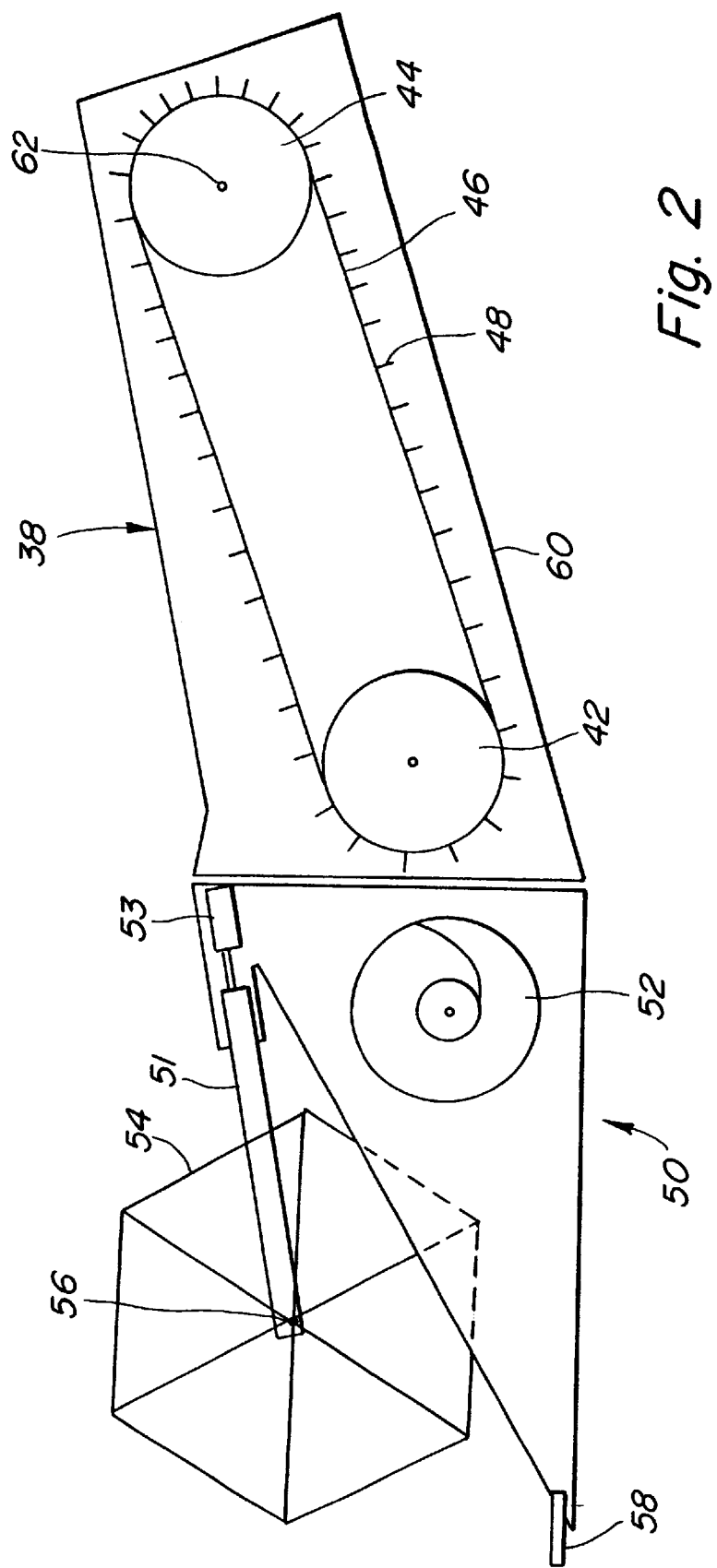
FIG. 2 is a schematic side view of a header and feederhouse of the combine shown in FIG. 1.

A harvesting machine in the form of a combine 10 is shown in FIG. 1 supported on front driven and rear steerable wheels 12, 14, respectively, and is provided with an operator's cab 16 from which it can be controlled by an operator. The operator's cab 16 is followed to the rear by a grain tank 18 that can deliver crop deposited in it through an auger 20 to the outside. The grain tank 18 is supported on a frame 22 within which crop material is separated into its large and small components in its path between a threshing cylinder 24 and a concave 26 and past a beater 28. Further separation of the harvested crop is performed on straw walkers 30, followed by a pan 32 and cleaning shoe 34, where finally, the threshed out portion of the crop is conveyed into the grain tank 18, the large components are deposited over the straw walkers 30 onto the ground and the light components are blown by means of a blower 36 from the cleaning shoe 34, also to the ground. The crop, after being taken up from the ground by a header 50, shown in FIG. 2, is conducted through a feederhouse 38 and over a stone catcher 40 to the cylinder 24. An internal combustion engine 25 is arranged behind the grain tank 18 and drives the crop processing devices of the combine and the wheels 12.

The header 50, reproduced in FIG. 2, is removably attached to the forward surface of the feederhouse 38, as seen in the forward operating direction of the combine 10. The header 50 is equipped with a cutterbar 58 to cut crop (in particular a grain crop) from the ground. The crop is conducted by means of a reel 54, driven in rotation in a counterclockwise direction about an axle 56, to an auger 52 that guides the crop toward the feederhouse 38. The reel can be adjusted in its position over a telescoping rod 51 and a hydraulic cylinder 53, in place of which a correspondingly controlled electric motor could be used. The reel can be brought by means of the hydraulic cylinder 53 from a normal operating position, in which crop is taken in, into a non-operating position, in which jammed crop can be ejected again by reverse operation of the feederhouse 38, the auger 52 and the reel 54. The reel 54 is spaced further from the auger 52 in the non-operating position than in the operating position.

The feederhouse 38 is provided with a housing 60, in which an endless conveyor chain 46 with rails 48 circulates about a lower feederhouse roll 42 and an upper feederhouse roll 44. The latter is driven in rotation by its shaft 62. The conveyor chain 46 with the rails 48 conveys the harvested crop into the combine 10 as an undershot conveyor.

Figure 3:
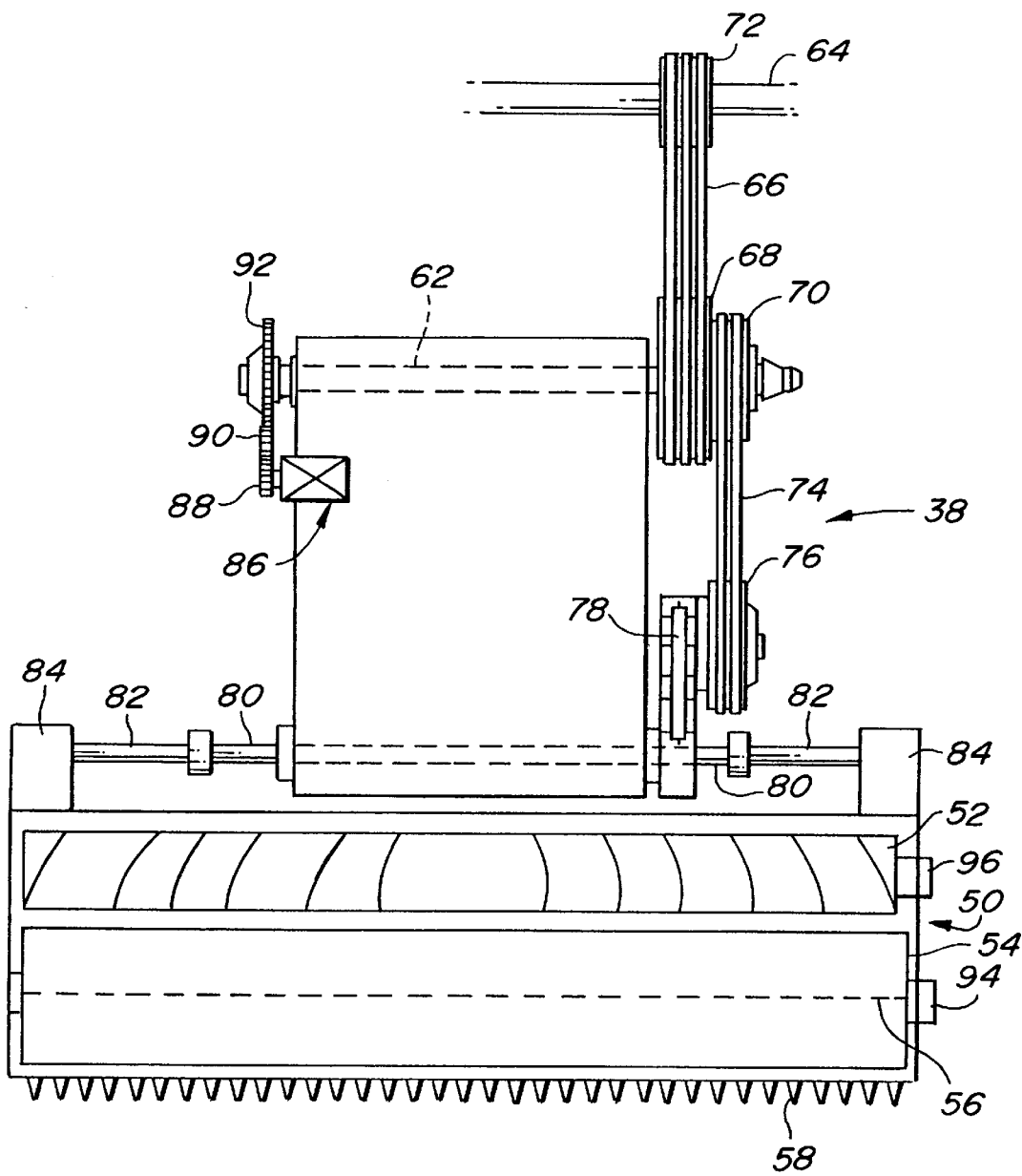
FIG. 3 is a schematic plan view of the header and feederhouse of FIG. 2 including the drive arrangement.

On the basis of the schematic plan view of the feederhouse 38 and the header 50, reproduced in FIG. 3, the drive mechanism for the individual elements can be seen. The engine 25 of the combine 10 drives (as a rule indirectly) a shaft 64 that may be the shaft of the cylinder 24 or of the beater 28. A belt pulley 72 is fastened to the shaft 64 and carries a triple belt 66. The belt pulley 72 is equipped with an electric clutch, not shown, but known in itself, with which the drive connection between the shaft 64 and the outside circumference of the belt pulley can be engaged and disengaged. Hence a torque is transmitted to the belt pulley 72 and the belt 66 only when the electric clutch is engaged. Furthermore the belt 66 circulates about a belt pulley 68 that is connected to a coaxial belt pulley 70 and about which a further belt 74 circulates. The belt pulleys 68 and 70 are mounted on the shaft 62 of the upper feederhouse roll 44. At the end opposite from the belt pulleys 68 and 70, the shaft 62 is connected to a reversible motor 86 through a chain sprocket 92, a chain 90 and a further chain sprocket 88. It should be noted that the shaft 64 could also drive the A conveyor chain 46 of the feederhouse 38 through belt pulleys connected to the lower feederhouse roll 42, while the reversible motor 86 is connected to drive indirectly the lower feederhouse roll 42 through the upper feederhouse roll 44 and the conveyor chain 46. Obviously the invention can be applied to other configurations of a feederhouse 38.

The belt 74 circulates about a belt pulley 76 positioned at the front end of the feederhouse 38 (as seen in the forward operating direction of the combine 10), which, for its part, drives a chain drive gearbox 78. The chain drive gearbox 78 drives hexagonal shafts 80 that are connected to the header drive shafts 82, so as to be removable, to either side of the feederhouse 38. One header drive shaft 82 is connected to the cutterbar 58 by a gearbox 84. The other header drive shaft 82 drives the auger 52 through a gearbox 96. The axle 56 of the reel 54 can be driven by means of a hydraulic motor 94.

In normal harvesting operation, the electric clutch in the belt pulley 72 is engaged and the engine 25 drives the shaft 62 of the upper feederhouse roll 44 through the belt 66 and the belt pulley 68. The header is also driven by the engine through the belt pulley 70 and the belt 74 through the drive mechanism described above. Since no other electric clutch is provided on the shaft 64 other then the electric clutch in the belt pulley 72, there is a drive connection between the reversible motor 86 and the shaft 62 of the upper feederhouse roll 44. Hence the reversible motor 86 is driven mechanically and operates as a hydraulic oil pump. It is connected by a hydraulic oil line with the hydraulic motor 94 of the reel 54, and drives the reel 54 which rotates in counterclockwise direction in normal harvesting operation in FIG. 2.

In reverse operation, that is in case jammed crop is to be ejected from the header 50 and/or the feederhouse 38, the electric clutch in the belt pulley 72 is deenergized. The reversible motor 86 is then powered hydraulically and drives the conveyor chain 46 of the feederhouse 38 in the opposite (reverse) direction while the hydraulic motor 94 is also powered in the opposite direction and rotates the reel in the opposite direction compared to normal harvesting operation. The auger 52 is also driven in reverse direction of rotation over the chain drive gearbox 78, the hexagonal shaft 80, the header drive shafts 82 and the gearbox 96. In this way, jammed harvested crop is again conveyed out of the feederhouse 38 and the header 50. In this operating mode the reel 54 can also be rotated in the opposite direction by corresponding loading of the hydraulic motor 94.

According to the invention a further, third operating mode is proposed in which the reversible motor 86 is also loaded hydraulically but in the same direction as that of the normal operating mode. In this operating mode, harvested crop can be conveyed slowly into the combine 10 after a jam, since the conveyor chain 46 is moved in the direction in which it is driven in normal harvesting operation, but at reduced speed. In this operating mode, due to the mechanical drive connection between the auger 52 and the reversible motor 86, the auger 52 is also rotated in normal, not reversed direction of rotation through the gearbox 96. Therefore the reversible motor can be driven in two directions, preferably with variable rotational speed, and drives the intake devices (auger 52 and conveyor chain 46) correspondingly forward or backward.

In a fourth operating mode, an emergency stop, the reversible motor 86 is used to brake the intake devices. Since the reversible motor 86 is used in normal operation as a hydraulic oil pump, the hydraulic oil pressure generated by it can be released through a valve, in particular a pressure relief valve, in order to perform the braking function in an emergency stop. In this operating mode, the electric clutch in the belt pulley 72 is de-energized and the rotational energy remaining from the normal harvesting operation in the auger 52, the conveyor chain 46, the lower and upper feederhouse rolls 42 and 44 as well as the intake elements (belts 66, 74, belt pulleys 72, 68, 70, 76, chain drive gearbox 78, hexagonal shaft 80, cutter head drive shaft 82, gearboxes 84, 96, chain sprockets 88, 92 and chain 90) is converted by the reversible motor 86 into kinetic energy of the hydraulic oil, which in turn is converted by the pressure relief valve into heat. In this way, a supplementary, effective brake is provided for the intake devices in the case of an emergency stop.

Figure 4:
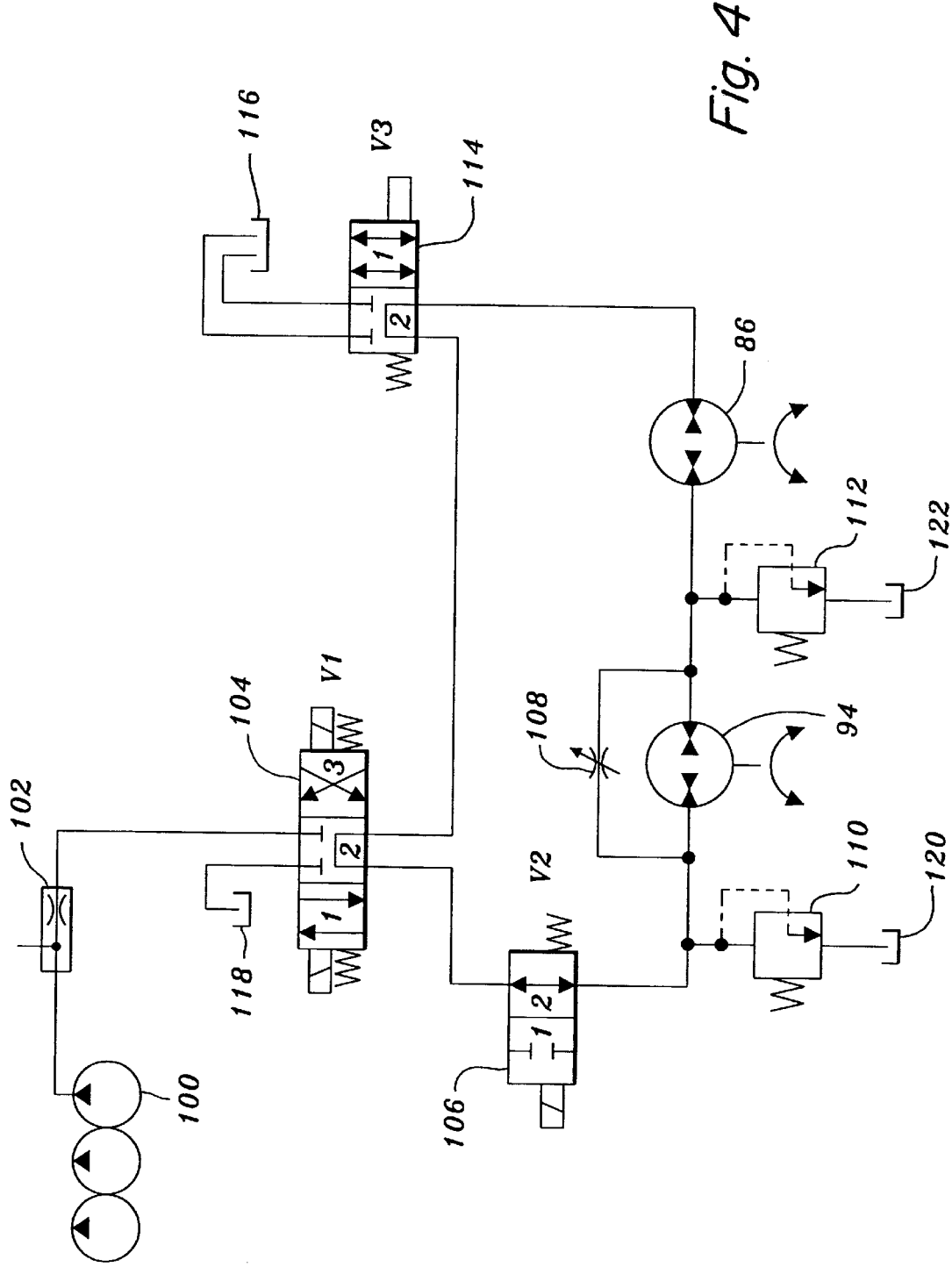
FIG. 4 is a hydraulic circuit of the drive arrangements of the header and feederhouse of FIG. 3.

In FIG. 4 a hydraulic circuit according to the invention is illustrated. It contains a pressure source 100 that, as a rule, is a hydraulic pump of the combine 10. The pressurized hydraulic oil from the pressure source 100 is conducted over a throttling valve 102 to a connection of a first valve 104, that is a three position, two way valve. In normal harvesting operation this connection is blocked. The valve 104 is in position 2 as is shown in FIG. 4.

A first connection of the hydraulic motor 94 to the reel 54 shown at left in FIG. 4, is connected over a pressure relief valve 110 to a reservoir 120 that contains hydraulic oil. This pressure relief valve 110 dissipates the high oil pressure in the reservoir 120, but is blocked under normal conditions. Furthermore the first connection of the hydraulic motor 94 is connected with a connection of a second valve 106 that is a two position, one way valve. In normal harvesting operation the second valve is in the position 2 shown, and the first connection of the hydraulic motor 94 is connected with a connection of the first valve 104. In normal operation the first valve establishes a connection with a third valve 114, a two position, two way valve, which is in position 1 in normal operation. In this position hydraulic oil is conducted into a reservoir 116. From this reservoir 116 a first connection of the reversible motor 86, which is driven in rotation and operates as a hydraulic oil pump, also takes hydraulic oil through the valve 114. A second connection of the reversible motor 86 is connected with a second connection of the hydraulic motor 94 and is connected through a second pressure relief valve 112 with a reservoir 122. The reservoirs 116, 118, 120 and 122 may be connected hydraulically among each other, or they may be combined into a single container.

An adjustable throttling valve 108 is arranged parallel to the hydraulic motor 94. As a result, in normal harvesting operation, the mechanically driven reversible motor 86 pumps hydraulic oil out of the reservoir 116, through the hydraulic motor 94, which drives the reel, into the reservoir 116. The rotational speed of the hydraulic motor 94 can be varied by means of the throttling valve 108. If it is closed, the entire hydraulic oil flows through the hydraulic motor 94, which runs at high rotational speed. If it is open, the hydraulic motor 94 will only rotate very slowly or stand still. The pressure relief valves 110, 112 protect the reversible motor 86 and the hydraulic motor 94.

The valves 104, 106, 114 can be brought into their particular positions mechanically or electromagnetically. This can be performed by appropriate operating elements (switches or the like) in the operator's cab.

In reverse operation, the first valve 104 is in position 3, the second valve 106 is in position 2 and the third valve 114 is in position 2. The hydraulic oil originating in the pressure source 100 is conducted to the reversible motor 86 through the hydraulic motor 94, and finally drained into the reservoir 118. Both motors 86, 94 rotate in a direction opposite to that of normal operation. The rotational speed of the reversible motor 86 can be adjusted by means of the adjustable throttling valve 102.

In the third operating mode, the slow ingestion of the harvested crop into the combine 10, the first valve 104 is in position 1, the second valve 106 is in position 2 and the third valve 114 is in position 2. In this operating mode the reversible motor 86 and the hydraulic motor 94 are operated in series, and they are driven hydraulically in the same direction in which they also rotate during normal harvesting operation. The rotational speed of the reversible motor 86 and the hydraulic motor 94 can be varied by means of the adjustable throttling valve 102.

In the fourth operating mode, the emergency stop, the first valve 104 is in position 2, the second valve 106 in the position 1, and the third valve 114 is in the position 1. Thereby the first connection of the reversible motor 86 is connected with the blocked second valve 106, and the reversible motor 86, which is driven by the kinetic energy of the intake devices, pumps hydraulic oil into the second pressure relief valve 112, and through the hydraulic motor 94 and the adjustable throttling valve 108 into the first pressure relief valve 110. The oil pressure generated by the reversible motor 86 is drained over both pressure relief valves 110, 112 into the reservoirs 120, 122 and the kinetic energy is converted into heat energy. Furthermore, at the first connection of the reversible motor 86 a negative pressure or vacuum develops. It is also conceivable that the third valve 114 is brought into position 1 in the emergency stop operating mode, so that the first connection of the reversible motor 86 is not blocked, but takes in hydraulic oil from the reservoir 116.

While the invention has been described in the context of a feederhouse and header crop conveying mechanisms, it will be appreciated that the invention can be used with crop processing mechanisms of a harvesting machine as well. In the claims that follow, the term "crop conveying mechanism" shall be interpreted as including crop processing mechanisms.

The invention should not be limited to the above-described embodiments, but should be limited solely by the claims that follow.

What is claimed is:

1. A drive arrangement for a crop conveying mechanism of a harvesting machine comprising:
   a main drive engine (25) that is arranged through power transmission elements to drive the crop conveying mechanism in a first operating mode in a first direction with a first speed; and
   a reversible motor (86) that is arranged to drive the crop conveying mechanism in a second operating mode at a second speed in a second direction, that differs from the first direction wherein the drive arrangement can also be operated in at least one of third and fourth operating modes in which in the third operating mode the reversible motor (86) drives the crop conveying mechanism in a first direction with a third speed, that is lower than the first speed, and in which in the fourth operating mode the drive arrangement is separated from the main drive engine and the reversible motor (86) operates as a brake for the crop conveying mechanism.

2. The drive arrangement as defined by claim 1 wherein the reversible motor (86) is a hydraulic motor.

3. The drive arrangement as defined by claim 2 wherein the reversible motor (86) is operated as a pump in the first operating mode and further comprising a second hydraulic motor (94) that is driven by the reversible motor (86).

4. The drive arrangement as defined by claim 3 wherein the speed of the second hydraulic motor (94) can be varied.

5. The drive arrangement as defined by claim 2 wherein in the fourth operating mode the oil pressure generated by the reversible motor (86) is drained through a valve.

6. The drive arrangement as defined by claim 5 wherein in the fourth operating mode the oil pressure generated by the reversible motor (86) is, in addition, drained through a second hydraulic motor (94).

7. The drive arrangement as defined by claim 1 wherein the speed of the reversible motor (86) can be varied in at least one of the second and third operating modes.

8. The drive arrangement as defined by claim 3 wherein the reversible motor (86) and the second hydraulic motor (94) are arranged in a series circuit in the second and the third operating modes.

9. The drive arrangement as defined by claim 3 wherein the second hydraulic motor (94) drives a reel (54).

10. A harvesting machine comprising:
    a crop conveying mechanism;
    a drive arrangement for driving the crop conveying mechanism including:
       a main drive engine (25);
       power transmission elements coupling the main drive engine to the crop conveying mechanism to drive the crop conveying mechanism in a first operating mode in a first direction with a first speed; and
       a reversible motor (86) coupled to the power transmission elements to drive the crop conveying mechanism in a second operating mode at a second speed in a second direction that differs from the first direction and to drive the crop conveying mechanism in a third operating mode in a first direction with a third speed that is lower than the first speed.

11. The harvesting machine as defined by claim 10 wherein the reversible motor (86) is a hydraulic motor that is driven as a pump by the main drive engine (25) in the first operating mode and further comprising a second hydraulic motor (94) that is driven by the reversible motor (86).

12. The harvesting machine as defined by claim 10 wherein the speed of the reversible motor (86) that can be varied in at least one of the second and third operating modes.

13. The harvesting machine as defined by claim 11 wherein the reversible motor (86) and the second hydraulic motor (94) are arranged in a series circuit in the second and the third operating modes.

14. A harvesting machine comprising:
    a crop conveying mechanism;
    a drive arrangement for driving the crop conveying mechanism including:
       a main drive engine (25);
       power transmission elements coupling the main drive engine to the crop conveying mechanism to drive the crop conveying mechanism in a first operating mode in a first direction with a first speed; and
       a reversible motor (86) coupled to the power transmission elements to drive the crop conveying mechanism in a second operating mode at a second speed in a second direction that differs from the first direction, the reversible motor (86) being arranged in a fourth operating mode in which the crop conveying mechanism is separated from the main drive engine to operate as a brake.

15. The harvesting machine as defined by claim 14 wherein the reversible motor (86) is a hydraulic motor that is driven as a pump by the crop conveying mechanism in the fourth operating mode and the oil pressure generated by the reversible motor (86) is drained through a valve.

16. A harvesting machine comprising:
    a crop conveying mechanism;
    a drive arrangement for driving the crop conveying mechanism including:
       a main drive engine (25);
       power transmission elements coupling the main drive engine to the crop conveying mechanism to drive the crop conveying mechanism in a first operating mode in a first direction with a first speed; and
       a reversible hydraulic motor (86) coupled to the power transmission elements to drive the crop conveying mechanism in a second operating mode at a second speed in a second direction that differs from the first direction, the drive arrangement can also be operated in third and fourth operating modes in which in the third operating mode the reversible motor (86) drives the crop conveying mechanism in a first direction with a third speed that is lower than the first speed, and in which in the fourth operating mode the drive arrangement is separated from the main drive engine and the reversible motor (86) operates as a brake for the crop conveying mechanism;
       the reversible motor (86) being in a hydraulic circuit having a first valve (104) that connects the reversible motor to a fluid pressure source (100) to operate the reversible motor in the first direction in the third operating mode and to operate the reversible motor in the second direction in the second operating mode and to block the reversible motor from the fluid pressure source (100) in the first and fourth operating modes, the hydraulic circuit having a second valve (106) that allows fluid flow through the circuit in the first, second and third operating modes and blocks fluid flow through the circuit in the fourth operating mode and the hydraulic circuit having a third valve (114) that connects the reversible motor (86) to a fluid reservoir (116) in the first and fourth operating modes.

17. The harvesting machine as defined by claim 16 further comprising a second hydraulic motor (94) in the hydraulic circuit in series with the reversible motor (86).

* * * * *